(12) United States Patent
Tuzhilin et al.

(10) Patent No.: US 8,719,403 B2
(45) Date of Patent: May 6, 2014

(54) METHOD AND APPARATUS FOR MONITOR AND NOTIFICATION IN A NETWORK

(75) Inventors: Alexander Tuzhilin, New York, NY (US); Ravinarayan Arunkundram, Jersey City, NJ (US)

(73) Assignee: New York University, New York, NY (US)

( * ) Notice: Subject to any disclaimer, the term of this patent is extended or adjusted under 35 U.S.C. 154(b) by 140 days.

(21) Appl. No.: 12/966,833

(22) Filed: Dec. 13, 2010

(65) Prior Publication Data

US 2011/0082930 A1   Apr. 7, 2011

Related U.S. Application Data

(63) Continuation of application No. 09/013,490, filed on Jan. 26, 1998, now Pat. No. 7,865,546.

(51) Int. Cl.
*G06F 15/16* (2006.01)

(52) U.S. Cl.
USPC .......................................... 709/224; 709/207

(58) Field of Classification Search
USPC ....................................................... 709/224
See application file for complete search history.

(56) References Cited

U.S. PATENT DOCUMENTS

| | | |
|---|---|---|
| 5,615,359 A | 3/1997 | Yung |
| 5,809,238 A | 9/1998 | Greenblatt et al. |
| 5,818,446 A | 10/1998 | Bertram et al. |
| 5,848,396 A | 12/1998 | Gerace |
| 5,860,071 A | 1/1999 | Ball et al. |
| 5,893,091 A | 4/1999 | Hunt et al. |
| 5,931,907 A | 8/1999 | Davies et al. |
| 5,978,842 A | 11/1999 | Noble et al. |
| 5,983,267 A | 11/1999 | Shklar et al. |
| 6,003,046 A | 12/1999 | Nielsen |
| 6,006,218 A | 12/1999 | Breese et al. |
| 6,006,252 A | 12/1999 | Wolfe |
| 6,029,165 A | 2/2000 | Gable |

(Continued)

FOREIGN PATENT DOCUMENTS

WO   WO 9731319 A1  *  8/1997   .............. G06F 17/30

OTHER PUBLICATIONS

Thomas Ball et al., Internet Difference Engine and its Applications, Compcom—IEEE Computer Society International Conference, IEEE, Jan. 1996, pp. 71-76.*

(Continued)

*Primary Examiner* — Patrice Winder
(74) *Attorney, Agent, or Firm* — Christensen O'Connor Johnson Kindness PLLC

(57) ABSTRACT

A user specifies one or more monitoring/probing rules on a client station. These rules specify user instructions for monitoring and probing conditions, events, and data on monitored sites on the Internet. The client station transfers the rules to the monitoring site, which also processes and interprets the rules. When the monitoring site processes these rules, it results in (1) allocation of space and (2) creation or initialization of agent programs, which will effect periodic monitoring of Internet sites and send data back to the monitoring site. If the retrieved information at the monitoring site satisfies the user-specified conditions, the monitoring site will conduct further exploration to gather more information that may help determine the causes of these conditions. The results of such a probe may be obtained from the monitoring site or the Internet, and are communicated by the monitoring site to the client station.

24 Claims, 5 Drawing Sheets

(56) References Cited

U.S. PATENT DOCUMENTS

| | | | |
|---|---|---|---|
| 6,029,175 | A | 2/2000 | Chow et al. |
| 6,047,327 | A | 4/2000 | Tso et al. |
| 6,085,186 | A | 7/2000 | Christianson et al. |
| 6,134,555 | A | 10/2000 | Chadha et al. |
| 6,182,066 | B1 | 1/2001 | Marques |
| 6,366,933 | B1 | 4/2002 | Ball et al. |

OTHER PUBLICATIONS

Lingnau, Anselm et al., "An HTTP-based Infrastructure for Mobile Agents", A. Lingnau et al., *An http-based infrastructure for mobile agents, Fourth International WWW Conference*, 1995, 13 pages. 1995.

A. Prasad Sistla et al. "Temporal Conditions and Integrity Constraints in Active Databases", ACM SIGMOD, vol. 24 No. 2 pp. 269-280, 1995.

Tuzhilin, A., "Templar: Acknowledge-Based Language for Software Specifications Using Temporal Logic" ACM Transactions on Information Systems, vol. 13, 1995, pp. 269-304.

Tuzhilin, A., "Extending Temporal Logic to Support High Level Simulations", ACM Transactions on Modeling and Computer Simulation, vol. 5, 1995, pp. 129-155.

McCarthy et al. "The Architecture of an Active, Objective-Oriented Database System", "Proceedings of the 1989 ACM SIGMOD International Conference on Management of Data" 1989, pp. 215-224.

U.W. Lipeck et al. "Monitoring Dynamic Integrity Constraints Based on Temporal Logic", Information Systems, vol. 12, 1987, pp. 255-269.

K. Hulsmann et al., "Theoretical Foundations of Handling Large Substitution Sets in Temporal Integrity Monitoring", Acta Informatica, vol. 28, 1991, pp. 365-407.

S. Saak et al., "Foundations of Temporal Integrity Monitoring" Elsevier Science Publishers, 1988, pp. 235-249.

R. Snodgrass, "A Relational Approach to Monitoring Complex Systems", ACM Transactions on Computer Systems, vol. 1988, pp. 157-196.

C. Zaniolo et al., "Advance Database Systems" Morgan Kauffmann Publishers, 1997, pp. 5-39.

Imielinski, et al. "Datamine Application Programming . . . " Proceedings of the Second International Conference on Knowledge Discovery and Data Mining, Aug. 1996.

Klemetinen, et al. "Finding Interesting Results from Large Sets.." Proceedings of the Third International Conference on Information and Knowledge Management; Dec. 1994.

Han, et al. DMQL—A Data Mining Query Language Prroceedings of the (SIGMOD) Workshop on Research Issues on Data Mining and Knowledge Discovery, Jun. 1996.

Shen, et al. "Metaqueries for Data Mining . . . " Chapter 15, AAAI Press 1996.

Agrawal et al. "Fast Discovery of Association Rules . . . " Chapter 12, AAAI Press 1996.

Siberschatz et al. "A Belief-Driven Discovery, Framework based on Data . . . " Center for Research on Information Systems, Leonard N. Stern School of Business, New York University N.Y. Dec. 1996, pp. 1-23.

J. Orwant "For Want of a Bit the User Was Lost: Cheap User Modeling" IBM Systems Journal, vol. 35, Nos. 3 & 4, pp. 398-416 (1996).

Chomicki, J., "History-Less Checking of Dynamic Integrity Constraints," Proceedings of the 8th IEEE Conference on Data Engineering, Tempe, Ariz., Feb. 2-3, 1992, pp. 557-564.

Shelton, D., "First Floor Releases Bookmark Utility," CNET News, Release date Jan. 9, 1996, <http://news.cnet.com/First-Floor-releases-bookmark-utility/2100-1010_3-201647.hmtl> [retrieved Apr. 4, 2013], 1 page.

\* cited by examiner

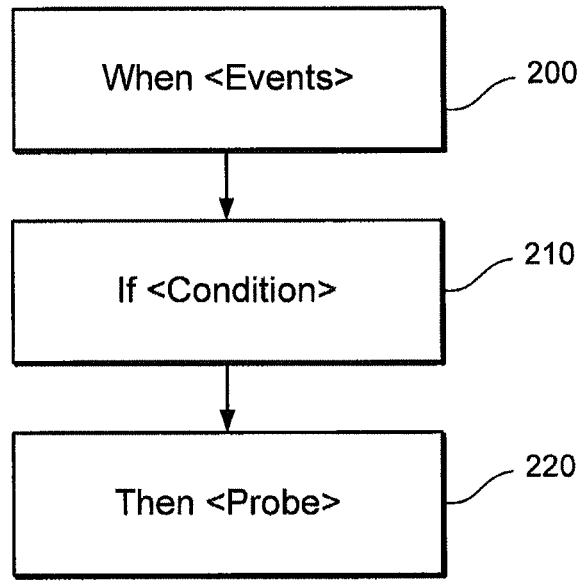
F I G. 3
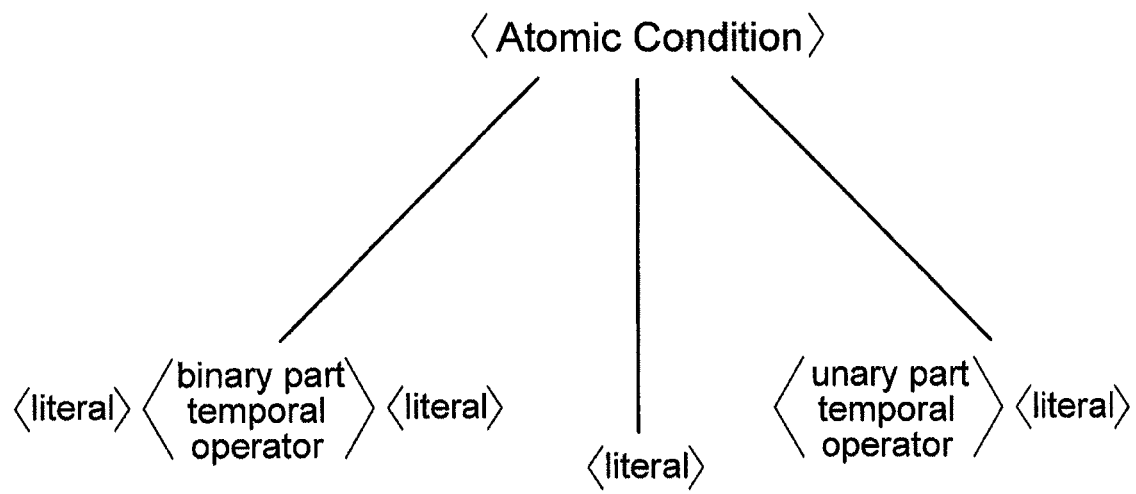
F I G. 4

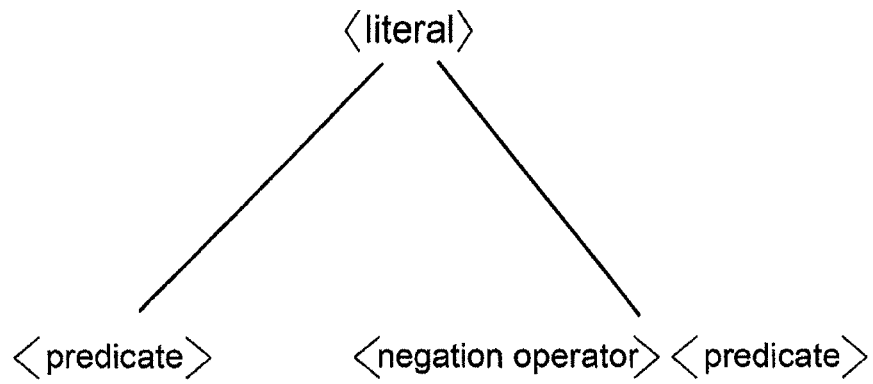
F I G. 5
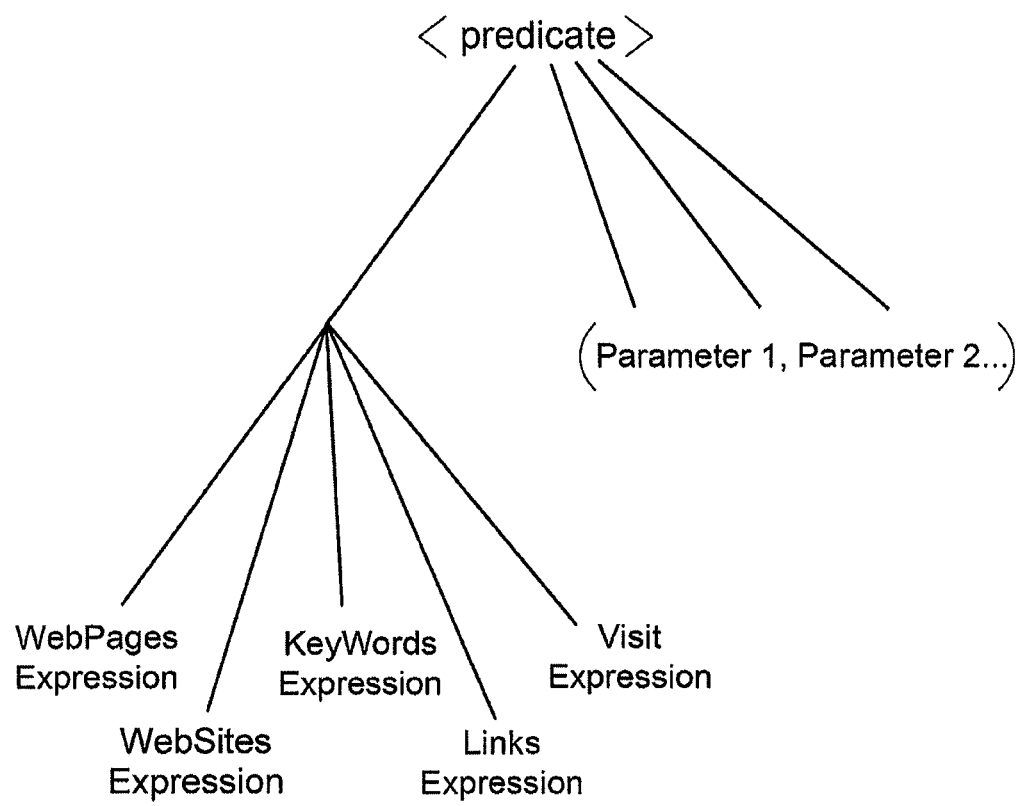
F I G. 6

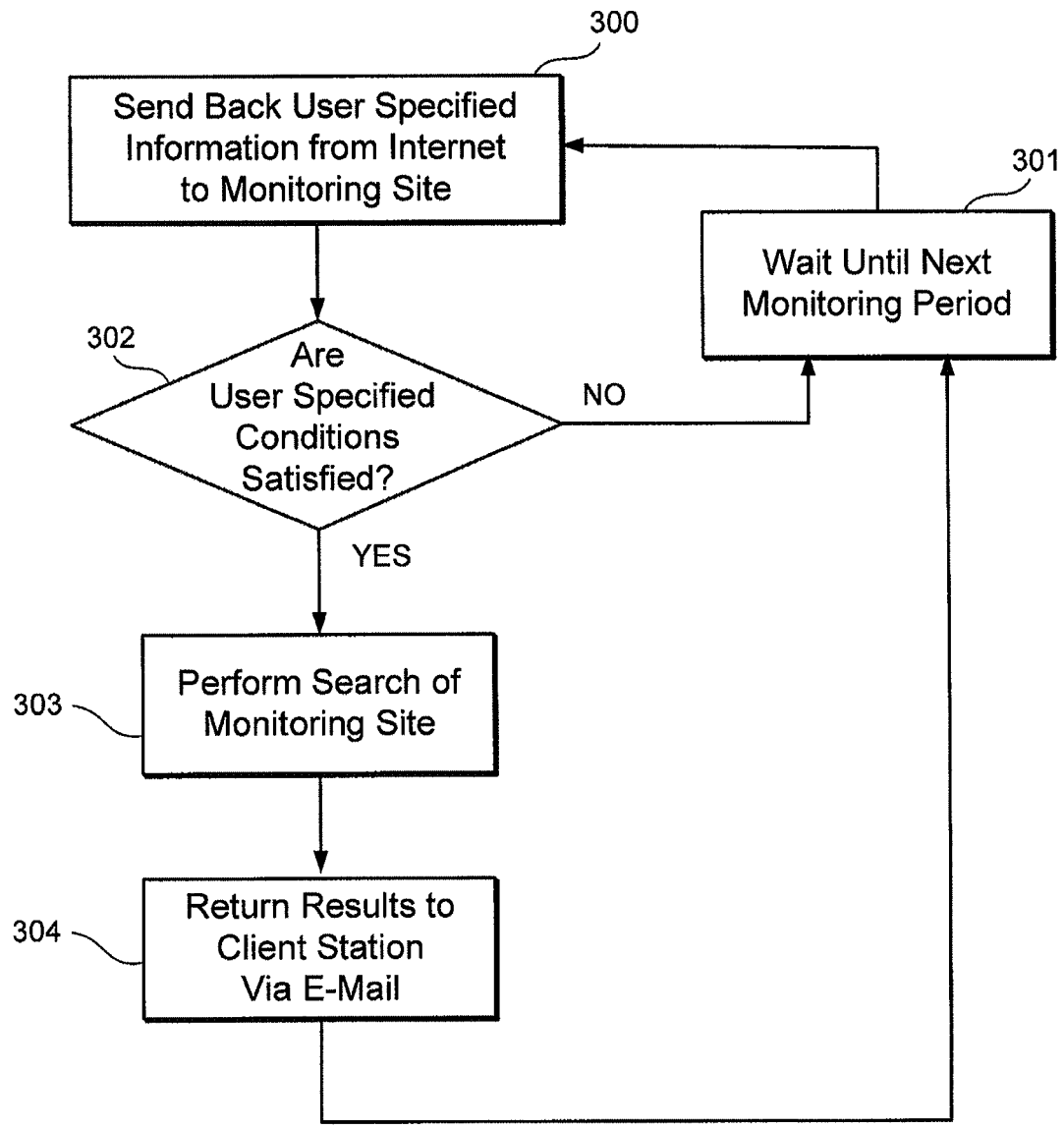
F I G. 7

METHOD AND APPARATUS FOR MONITOR AND NOTIFICATION IN A NETWORK

FIELD

This invention relates to a method and apparatus for monitoring and searching a network, such as the Internet, and for notifying one or more user(s) of the results.

BACKGROUND INFORMATION

In recent years, the Internet has become more popular, allowing users to access information in ways never before possible. Information on the Internet is useful to a broad spectrum of individuals, including investors, financial analysts, entrepreneurs, and academics. Changes reflected in a Web page, a large dip in a stock's value, or a new merger amongst competing companies, for instance, may be of critical importance to the users of the network.

However, keeping track of this constantly changing information is not easy. Logging on to the Internet every day to monitor changes can be time consuming. Thus, Web utilities have been developed, for instance, FirstFloor's "Smart Bookmarks"™, which periodically monitor user defined Web sites and automatically notify the user when changes occur at a Web site (e.g., a change in the text), without the user having to log on.

Unfortunately, such monitoring utilities generally do not allow the user to customize the type of change or information being monitored to the particular interests of the user. In addition, while such utilities can monitor changes within a particular Web site, they cannot monitor relationships amongst changes in several Web sites. Such changes, for example, the addition of a keyword reflecting a new product at several Web sites, may indicate the move to a new technology. Similarly, newly created links amongst a group of Web sites may indicate an industry alliance is forming. Such industry wide (not company specific) information may be of greater importance to the user than changes reflected at a single Web site. Thus, a user may be forced to constantly monitor several Web sites in search of such new relationships, an even more time consuming and difficult task than monitoring a single Web site.

Another limitation of such utilities is that once a change is detected at a given Web site, the change is automatically communicated to the user, regardless of its importance. Thus, a great deal of information irrelevant to the user may nevertheless be communicated, again wasting the user's time.

What is needed is a utility which (1) monitors the Internet for the occurrence of user-defined conditions, including relationships amongst one or more Web sites, (2) performs a search for information of importance to the user upon detection of such conditions, and (3) provides the user with the results of the search.

SUMMARY

Various embodiments of the present disclosure overcome the above-mentioned disadvantages of prior art Web monitoring and search utilities. The present invention (1) periodically monitors for user-defined conditions, including relationships amongst one or more network sites, (2) probes for further information upon detection of such conditions, and (3) automatically reports results to the user.

Thus, one advantage of at least one embodiment of the present disclosure is that it automatically monitors for conditions and relationships specified by a user, thus customizing the automatic monitoring according to his or her interests.

Another advantage of at least one embodiment of the present disclosure is that it allows automatic monitoring of changes and relationships involving more than one Web site or Web page. Such relationships (e.g., industry wide, as opposed to company specific, trends) may be of particular import to users.

Another advantage of at least one embodiment of the present disclosure is that upon the detection of a user-specified condition(s), the system performs a user-specified search for information which may be of import to the user or which may explain the occurrence of the user-specified condition(s). In other words, the system does not immediately alert the user as soon as a minor change in the domain of his interest takes place. The system continues to explore to see if this change is accompanied by some activities that are of interest to the user and returns a more refined list of those changes. This probing feature provides at least two related benefits.

First, it acts as an information filter. Thus, it avoids the information overload that makes most simple monitoring mechanisms less than useful.

Second, the feature allows for "intelligent" information gathering from the Internet or other related networks. The feature allows the user to define triggers that make an explicit connection between what is a symptomatic event and what needs to be further investigated. For example, the occurrence of an event (e.g., the deletion of a link to a site) may be significantly correlated with one phenomenon (e.g., addition of, a link from a different site) but may be entirely meaningless in the context of other phenomena (say, a surge in the number of visits to the site). Thus, the combination of a monitoring feature and probing feature allows an Internet user to find logical relationships between events, as well as learn their possible implications.

Another advantage of at least one embodiment of the present disclosure is that monitoring, searching, and notification functions may take place without a user log-on into the Internet.

Another advantage of at least one embodiment of the present disclosure is that a user may specify the monitoring conditions and searches in a high-level language, similar to English. Thus, a user need not have specialized computer programming knowledge to benefit from the present disclosure.

Further advantages and benefits shall become apparent upon review of the following detailed description and the drawings.

BRIEF DESCRIPTION OF THE DRAWINGS

FIG. 3 shows a general overview of the components of the monitor/probing rules which can be specified by a user and which are interpreted and executed by a processing device in one possible embodiment of the present disclosure;

FIG. 4 depicts a possible syntax and component structure of an atomic condition which may be specified in the monitor probing rule depicted in FIG. 3;

FIG. 5 depicts a possible syntax and component structure of the literals shown in FIG. 4;

FIG. 6 depicts in detail a possible syntax and component structure of the predicates shown in FIG. 5; and FIG. 7 is a flow chart showing steps which may be performed by an agent program and by a processing device at a monitoring site in accordance with instructions specified in the monitoring/probing rule depicted in FIG. 3.

DETAILED DESCRIPTION

Figure 1:
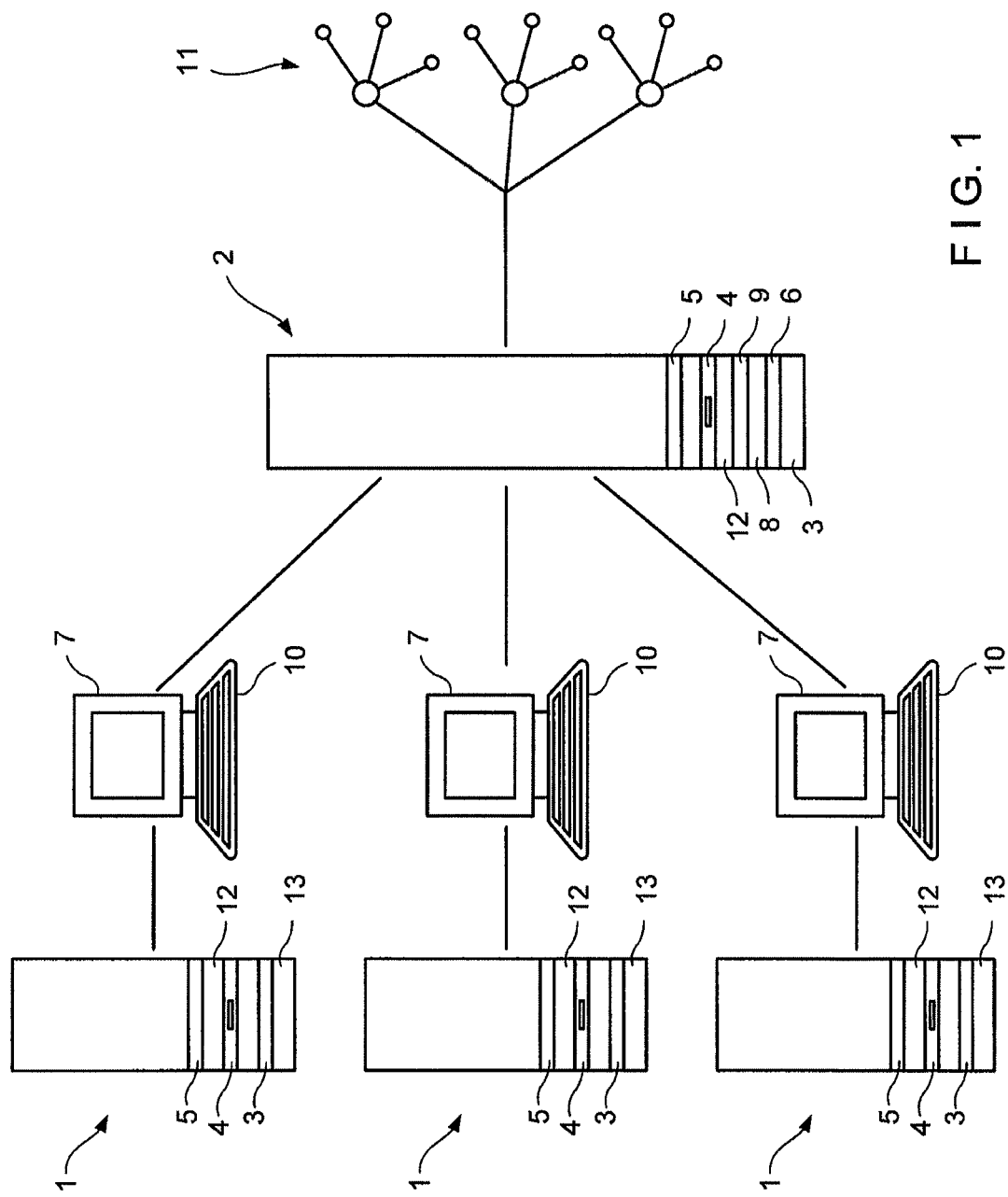
FIG. 1 shows one possible apparatus implementing an embodiment of the present disclosure.

FIG. 1 shows an apparatus implementing one embodiment of the present disclosure. Client station(s) 1 are coupled via communications or other lines to monitoring site 2 which is coupled to (possibly) remote monitored sites via a network 11 (e.g., the Internet).

The client station(s) 1 comprises a computer processing device 3, storage device 4, memory device 12, display device 7, user input device 10, and user interface element 13. The computer processing device 3 can be, for example, a single microprocessor chip (such as an Intel Pentium chip), printed circuit board, several boards, or other processing device. The storage device 4 can be, for example, an internal or external disk, tape cartridge, or CD-ROM. The faster access and greater storage capacity the storage device 4 provides, the more preferable the implementation. The memory device 12 can be implemented with, for example, a collection of RAM chips. The display device 7 can be implemented, for example, with a monitor, whether analog or digital. The user input device 10 can be implemented, for example, with a keyboard, mouse, or scanner. The client station(s) 1 also include a user interface element 13, which can be implemented as separate "software" (i.e., a program, process) whose instructions are executed by the computer processing device 3. However, there is no reason the computer processing device 3 (e.g., microprocessor chip) could not include the user interface element 13 process itself.

The monitoring site 2 comprises a computer processing device 3, storage device 4, memory device 12, rule interpretation element 6, database allocation and search element 8, and agent creation/modification element 9. The computer processing device 3 can be implemented with, for example, a single microprocessor chip (such as an Intel Pentium chip), printed circuit board, several boards, or other device. The storage device 4 can be implemented with, for example, an internal hard disk, tape cartridge, or CD-ROM. The faster access and greater storage capacity the storage device 4 provides, the more preferable the embodiment. The memory device 12 can be implemented with, for example, a collection of RAM chips. The rule interpretation element 6, database allocation and search element 8, and agent creation/modification element 9 can be implemented as separate "software" (i.e., programs, processes) whose instructions are executed by the computer processing device 3. Again however, there is no reason the computer processing device 3 (e.g., microprocessor chip) could not be used to implement the rule interpretation element 6, database allocation and search element 8, and agent creation/modification element 9 processes itself.

If the client station(s) 1 are connected to the monitoring site 2 via a telephone system or other system/lines not carrying digital pulses, the client station(s) 1 and monitoring site 2 may both also include a communications converter 5. The communications converter 5 can be implemented with any communications converter device, such as, for example, a modem. The communications converter 5 converts digital pulses into the frequency/signals carried by the line and also converts the frequency/signals back into digital pulses, allowing digital communication.

As depicted in FIG. 1, the monitoring site 2 is connected to one or more client station(s) 1, and its resources may be shared by one or more clients in most common implementations. Thus, for such implementations, the monitoring site 2 may be referred to as a "server" with "clients" (i.e., client stations 1), wherein the "server" is coupled to a (usually remote) network.

However, despite the embodiment described above, it is worthy of note that client station(s) 1 may each contain the elements included in the monitoring site 2. Therefore, a monitoring site 2 is unnecessary.

Figure 2:
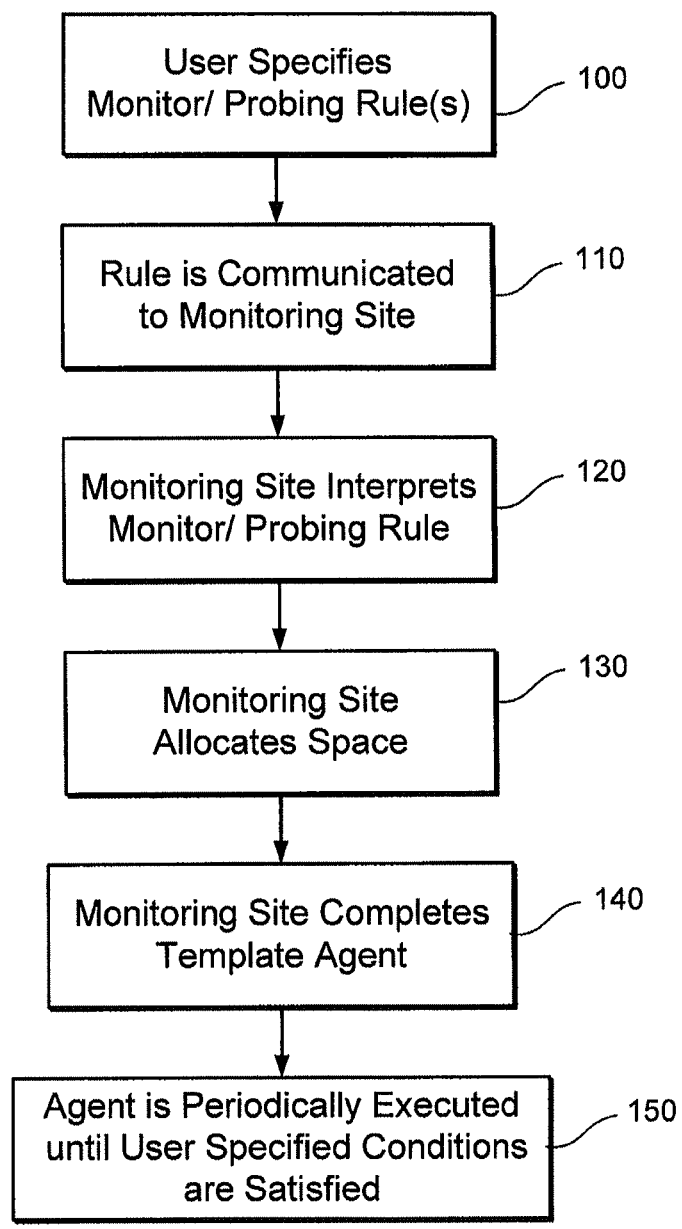
FIG. 2 is a flow chart depicting an overview of one possible embodiment of the method of the present disclosure.

FIG. 2 is a flow chart depicting an overview of one possible embodiment of the method of the present disclosure.

In step 100 depicted in FIG. 2, a user at client station 1 specifies via user input device 10 one or more monitor/probing rule(s) using the facilities of the user interface element 13 which is displayed on the display device 7. Put simply, the monitor/probing rule specifies what information the user wants monitored, what information the user wants retrieved, and under what circumstances. The user interface element 13 can be a set of choices in a displayed menu, a displayed form, or other means for facilitating (preferably) easy, intuitive input.

In step 110, the monitor/probing rule(s) data is sent from client station 1 to monitoring site 2. Again, the communication converter 5 may be necessary to effect this communication.

In step 120, the rule interpretation element 6 running off the computer processing device 3 at the monitoring site 2 converts the monitor/probing rule data into a set of instructions the computer processing device 3 is already designed to execute.

The computer processing device 3 on the monitoring site 2 executes the interpreted instructions of the monitor/probing rule, which are in memory device 12 for this purpose. This execution results in two operations.

First, in step 130, the database allocation and search element 8 running off the computer processing device 3 at the monitoring site 2 allocates space on the storage device 4. Conceptually, in one possible embodiment of the present disclosure, this can be thought of as creating space for a table(s) of records, with one or more fields per record. Initially, the conceptual table(s) are empty, but records are added to the table(s) later on as information is retrieved for monitoring purposes.

Second, in step 140, the agent creation/modification element 9 also running off the computer processing device 3' at the monitoring site 2 alters a "template" agent program already existing in the storage device. In an alternative embodiment, the computer processing device 3 may create a new agent if one does not already exist.

Agents are well known in the art. Briefly, "agents" are programs which can run off the computer processing device 3 of a computer, be sent over communications lines, and can then be run off the computer on the receiving end. They are therefore particularly suited for search and retrieval of information over the Internet.

In the above-described embodiment of the present disclosure, once created/modified, the "agent" program periodically executes retrieval and monitoring operations. Also in a possible embodiment of the present disclosure, once user-specified monitored conditions are satisfied, the database allocation and search element 8 running off computer processing device 3 of the monitoring site 2 will execute a user-specified exploring request (e.g., search or retrieval operation) in storage device 4 through files therein (i.e., through conceptual table(s) of records retrieved by agent operations from Internet 11). Results of the search can be sent from monitoring site 2 to client station(s) 1, and then can be displayed on display device 7 for the user's benefit.

The method and apparatus of the embodiment heretofore described will become more apparent from the more detailed description below.

Note that the monitor/probing rules which may be specified by a user (FIG. 2, step 100) are preferably in a "high-level" language (i.e., like English, or otherwise such that the user can write instructions without a specialized programming language). In order to accomplish this, the embodiment should preferably include means to convert the high-level language in which the monitor probing rule is specified into a set of instructions that may be executed by a processing device of a computer.

For example, in the presently described embodiment, the monitoring/probing rule data is sent to monitoring site 2 (FIG. 2, step 110) which includes rule interpretation element 6 (i.e., a language processor in the form of "software"). Rule interpretation element 6 performs the rule interpretation function depicted in step 120, FIG. 2. Such a translator must necessarily encompass rules governing the structure of the higher level language being translated. A possible set of such rules is more fully described as follows.

FIG. 3 shows a general overview of the components of the monitor/probing rules which may be specified by a user (step 100, FIG. 2) and which is interpreted and executed by a processing device in one possible embodiment of the present disclosure. A user via the user input device 10 specifies a statement of the form WHEN-IF-THEN, as shown in FIG. 3.

The WHEN and IF clauses form the monitoring part of the rule trigger, and the THEN clause forms the probing part of the rule. The monitoring part of the trigger will effect a "watching" for certain events to occur that satisfy certain conditions. Once the system detects appropriate events, it does not necessarily inform the user about this. Instead, the system tries to explore the situation in which these events occur by executing certain probing actions specified in the probing part of the trigger, i.e., the THEN clause. The structure of a rule is similar to the structure of triggers used in active databases; however, the nature of the events, conditions, and especially probing actions is substantially different, as will be explained below.

In the case of the WHEN portion of the statement, the user specifies an "event" parameter (step 200). An event is a change in the state of one or more of the objects (e.g., Web sites on the Internet 11) that are being monitored. For instance, an appearance or disappearance of one or more keywords, the appearance of a new link between two sites, a change of physical attributes of a Web page, or the like, are examples of events.

In the case of the IF portion of the statement, the user specifies a "condition" parameter (step 210). Conditions are constraints that the user applies to events and act as filters that refine the space of the events to result in a smaller subset, that are of interest to the user.

In the case of the THEN portion of the statement, the user specifies a "probing action" parameter (step 220). In general, the probing action investigates what is going on at the site or a collection of sites once the events in the WHEN clause occurred and satisfied the conditions of the IF clause.

The following examples illustrate the general structure of the WHEN-IF-THEN monitor/probing rule(s), translated in plain English.

Example 1

WHEN the keyword "cable modem" appears on a site, IF the keyword "push technology" is not included in the text of the site, THEN find out how many sites from the predefined list of sites the word "cable modem" appeared and of these how many featured the keyword "push technology".

Example 2

IF several Web sites are linked into a "star" configuration AND the keyword "cable modem" is found on all the nodes in the configuration, THEN find all such "star" configurations.

Example 3

IF a keyword consisting of "push technology," "Web TV," "channels" appears in all Nodes (members) of a user-defined configuration, THEN find all such configurations where such keywords appeared and return the list of the corresponding Uniformed Resource Locators (URLs).

Example 4

IF the number of visits to a site increases at a rate greater than R AND the sites contain the keywords set {cable modems, Web TV}, THEN find all sites that contain the same keywords and whose visit rate was greater than R; return the set of corresponding URLs.

Example 5

WHEN a keyword appears at a site AND links to that site from other sites disappear, THEN find all the sites from which links to this site disappeared, find out if these sites have any keywords in common, find all the sites which are now linked to this site, find out if these sites have any keywords in common, and return the four lists.

Notice also from the above examples that although events in the monitoring part of the rule are useful, it is not necessary to use them in general for monitoring Web activities. The reason for that is that they can be simulated through the conditions of the IF clause alone (the events describing a set of circumstances which are a subset of those described by the conditions and events). Also, a monitoring/probing rule may contain only the WHEN and THEN clauses (i.e., no IF clause).

For simplicity's sake, in the embodiment described more fully below, events in the WHEN clause (FIG. 3, step 200) will be specified by indicating certain conditions in the IF clause (FIG. 3, step 210) using the methods known to a person having skills in the art. Therefore, we will focus only on the structure of conditions and probing actions in the rest of this section. Again, the present disclosure is by no means limited to the embodiment described below.

Note that an event may be atomic or composite. The composite event is the conjunction of two or more atomic events. One of the most popular methods to define composite events is through a conjunction of atomic events, i.e., as E1 and E2 and . . . En, where E1 and E2 and . . . En are atomic events, such as "a link between two sites appears," "a keyword appears within a site," or "a page or link was deleted." However, composite events can be defined in more general terms as well (e.g., as a conjunctive or disjunctive form (CNF or DNF) of its atomic events). Atomic events may belong to one of the following classes (but atomic events are not limited to just these classes): 1) a link appears/disappears; 2) a keyword (or a group of keywords) appears on a page; 3) a page's text is modified; 4) a change in the physical attributes of a page; 5) a visitor visits a page. One way to specify conditions in the IF clause of a monitoring/probing rule would be through a conjunction of atomic conditions, i.e., as P1 and P2 and Pn, where Pi is an atomic condition. Consistent with this method, in general, the IF clause can be defined as the conjunctive normal form or a disjunctive normal form of atomic conditions. Conjunctive and disjunctive normal forms are well known in the art. An example of an IF clause is: IF Site S1 is Linked to Site S2 AND keyword Ki appears in S2 AND keyword Kj exists in S1 (where "Site S1 is Linked to Site S2," "keyword Ki appears in S2" and "keyword Kj exists in S1" are atomic conditions).

In order to define atomic conditions, it is also necessary to explore the modeling primitives (or the basic entities) used in our monitored environment. In one possible embodiment of the present disclosure, the information to be monitored, searched, and retrieved is on the Internet, or more specifically, the World Wide Web. In this environment, the modeling primitives (basic entities) might be:

1. Web Pages: A Web page is a collection of text, pictures, video, and/or audio objects (and/or other media) that are on the Web and share the same URL. Two different Web pages will not have the same URL. A Web page may have physical attributes such as size, date of last change, title, etc. Web pages may also be referred to as "pages," below.

2. Web Sites: A Web site is a collection of one or more Web pages. Pages within a site are linked by links. A Web site also has a URL which uniquely identifies the site. Web sites may also be referred to as sites.

3. Keywords: These are text objects (words, phrases, etc.) found in a Web page and, therefore, by extension, found in a Web site.

4. Links: Links are embedded in Web pages and allow a visitor to move from one location to another. A link may take a user from one page to another or may simply take him/her to another location on the same page.

5. Visit: Refers to the act of a visitor (anybody who reaches a Web site) visiting a site.

In addition to these basic entities, composite conditions can be derived from the basic entities using a data definition language (for example, if the basic entities are defined in terms of a relational data model as tables, the composite entities are defined as relational views, i.e., as SQL expressions). Examples of these composite entities are:

1. Configuration: A collection of Web sites that are linked to each other. A configuration can have one (trivial case) or more Web sites. For example, a set of sites linked in a circular fashion forms a "ring" configuration; or a configuration consisting of a central site that is linked to all other sites in the configuration and other sites being linked only to the central site, forms a "star" configuration.

2. Reach relation: Specifies which sites can be reached from a given site. This relation can be defined as a transitive closure of the LINKS relation described herein.

In the present disclosure, basic and derived entities are modeled as data objects in the corresponding data model. For example, if the data model is relational, then these entities are modeled as relations (predicates). If the data model is objec-toriented, then they are modeled as data objects.

In the embodiment described below, the relational data model is used in building the rule interpretation means 6 and database allocation and search means 8 and the basic entities are modeled as predicates (using relational terminology, they can sometimes be called "relations" or "tables"). For example, LINKS is a predicate of the form LINKS (site1, site2), where site1 is the site from which the link originates and points to site2. However, the present disclosure is not limited to the relational data model and is applicable to other data models as well.

Moreover, some of the predicates are temporal because they change over time. For example, the predicate LINKS may change over time (because links can be added and removed over time).

Once the basic entities of the data model are defined (e.g., as predicates/relations), the atomic conditions in the IF clause of the monitor and its structure can be defined as illustrated in FIG. 4. FIG. 4 depicts a possible syntax and component structure of atomic conditions.

As depicted in FIG. 4, an atomic condition can either be a literal, a past unary temporal operator followed by a literal, or a literal followed a binary past temporal operator followed by a literal. Some examples of unary past temporal operators include "Always_in_the_past," "Sometimes_in_the_past," "Sometimes_within_the_past (T time units)" and "Always_within_the_past (T time units)." An example of a binary temporal operator is "Since."

As depicted in FIG. 5, a literal is either a predicate or a negation operator (e.g., "NOT") followed by a predicate.

FIG. 6 depicts in detail a possible syntax and component structure of the predicates shown in FIG. 5. Again, FIG. 6 depicts one possible syntax and component structure of such predicates, and the present disclosure is in no way limited thereto. As depicted in FIG. 6, a predicate may be constructed by one of five expressions followed by one or more parameters in parentheses. Based on the basic entities of the Internet environment described above, the expression may be "WebPages," "WebSites," "KeyWords," "Links," and "Visit."

Based on the rules described above, some examples of atomic conditions which may appear in the IF portion of the monitoring/probing rules are as follows:

1. Key_Words (site,keyword,count), a predicate meaning that the user has specified that the cite keyword "keyword" has count "count" at site "site".

2. "LINKS (site1, site2) Sometimes_within_the_past (2 weeks)"—meaning that a link existed at some point between sites site1 and site2 within the past 2 weeks. Note that LINKS is a temporal predicate because it implicitly changes over time.

3. "Key_Words (XYZ, "cable-modem", count) Since LINKS(XYZ, ABC)"—meaning that the keyword "cable modem" appeared at cite XYZ since the link was established between sites XYZ and ABC.

Turning now to the THEN clause portion of the monitoring/probing rule, the THEN clause consists of a sequence of probing operations. In one possible embodiment of the present disclosure, the structure of the THEN clause can be defined as a query in Structured Query Language ("SQL"). SQL is well known in the art and is suited to search and retrieval in a relational database environment, such as the one described above. Thus, the rule interpretation means 6 may include SQL interpretation means, well known in the art. However, the THEN clause can include numerous other constructs, some of which are discussed in greater detail later.

Examples of probing actions expressed as SQL queries follow. Assume that in the monitoring part of a trigger, it was detected that a certain configuration among a group of sites was broken when a certain keyword appeared in one or more of these sites. Then, in the probing part, we may want to find the list of all sites whose links to those sites where the keyword appeared were deleted after the appearance of the keyword. Such probing actions can be expressed with SQL queries, three examples of which follow.

The first query extracts the list of all sites that point to one particular site (e.g., www.target.com) in the previous monitoring period, before the keyword appeared:

```
SELECT [Web Links Data]. [Origin of Link], [Web Links
Data]. [Target Site],
    [Web Links Data]. [Monitoring Period], [Web Links
Data]. Status
FROM [Web Links Data]
WHERE ((([Web Links Data].[Target
Site])="www.target.com") AND (([Web
    Links Data]. [Monitoring Period])="T – V) AND (([Web
    Links Data]. Status) =Yes)).
```

The second query extracts all those sites that do not have a link with that site in the present monitoring period and stores them as a temporary table called ("TEMP: Sites with no current link"):

```
SELECT [Web Links Data]. [Origin of Link], [Web Links
Data]. [Target Site],
    [Web Links Data]. [Monitoring Period], [Web Links
Data]. Status
FROM [Web Links Data]
WHERE ((([Web Links Data].[Target
Site])="www.target.com") AND (([Web
    Links Data]. [Monitoring Period])="T") AND (([Web
    Links Data].Status)=No)).
```

The third query joins the two temporary tables in an SQL Query and extracts the list of those sites that have deleted a link in the current monitoring period.

```
SELECT [TEMP: Sites with no current link]. [Origin of
Link]
FROM [TEMP: Sites with no current link] INNER JOIN
[TEMP:sites with earlier
    link] ON [TEMP: Sites with no current link].[Origin
    of Link] = [TEMP:sites with earlier link]. [Origin
    of Link]
GROUP BY [TEMP: Sites with no current link]. [Origin of
Link]
ORDER BY [TEND: Sites with no current link]. [Origin of
Link].
```

Thus, the WHEN-IF-THEN, or as described above, IF-THEN rule, can be described by constructs such as those described above as well as, for example, SQL interpretation means and thus translated by rule interpretation element 6 into instructions executed at monitoring site 2 by computer processing device 3.

The computer processing device 3 executes the interpreted instructions of the monitor/probing rule, which are in memory device 12 for this purpose. In the embodiment described herein, this execution results in two operations.

First, turning again to FIG. 2, in step 130, the database allocation and search element 8 running off the computer processing device 3 at the monitoring site 2 allocates space on the storage device 4. Conceptually, this can be thought of as creating space for a table(s) of records, with one or more fields per record. Initially, the conceptual table(s) are empty, but records are added to the table(s) later on as information is retrieved for monitoring purposes.

For example, assuming that the IF portion of a monitor/probing clause consists entirely of an atomic condition in the form Key_Words (site, keyword, count), a file is created on the monitoring site 2 which can be conceptualized as a "Key_Words" table with "site," "keyword" and "count" fields (or columns). Each time a new keyword entry at a site is retrieved from the Internet, the entry can be conceptualized as another row of the table which includes the appropriate count of the number of times this keyword appears at that site.

Alternatively, assuming that the IF portion of a monitor/probing clause consists entirely of an atomic condition "Links (site1, site2) Sometimes_within_past (2 weeks)," a file may be created on the monitoring site 2 that is represented as a temporal relation using methods well known in the art. Alternatively, such temporal atomic conditions may be represented on the monitoring site 2 using the implemenation methods described later.

Next, in step 140 of FIG. 2, the agent creation/modification element 9 also running off the computer processing device 3 at the monitoring site 2 alters a "template" agent program already existing in the storage device 4. In an alternative embodiment, the computer processing device 3 may create a new agent if one does not already exist.

A more detailed description of steps 130 and 140 is as follows: Without loss of generality, in the following description, assume that triggers have only the IF clause and the THEN clause (no WHEN clause).

First, determine the set of (temporal) predicates for each atomic condition in the IF clause (either temporal predicates or the auxiliary predicates as described later). Allocate data storage for these tables using the methods known in the art.

Second, given an IF clause, determine for each temporal or non-temporal predicate generated in step 1 ("real" predicate, not the auxiliary predicate) the set of Web sites S from which information should be obtained to evaluate that predicate. For example, if the If statement is IF KeyWords (site,word,count) and site IN
    {www.disney.com,www.oracle.com} and predicate is KeyWords (site,word,count) then the set S consists of {www.disney.com,www.oracle.com} for that predicate. In this simple example, there is only one predicate in a clause. In case there is more than one predicate in the IF clause, the determination of the set of sites S can be done by someone with the ordinary skill in the art.

Third, for each predicate and each site in set S computed in step 2, generate an agent that goes to that site and periodically downloads the necessary data needed to evaluate that predicate (note that the agent is permanently allocated to the monitored site; once in a while, it can be moved out by the site, but then it tries to get back again).

The agent is developed as follows. An agent template is written for each type of predicate by the system developer at the time the monitoring system is designed (this means that the Web monitoring system is shipped to the user with a set of predefined agent templates—that can be extended later by the user). For example, for the LINKS predicate, the agent template is a software program that travels to a Website (specified as an argument for that template) and periodically downloads all the links to which this site points (note that the downloading period is another argument). When the agent template is initiated as a part of the agent generation/sending procedure, the arguments of the template are initiated with real parameters. For example, in the case of the LINKS predicate, the agent template is instantiated with the parameters indicating the site to which the agent must travel and the downloading period. In the most general case, every monitoring period, the agent brings back to the monitoring site the entire predicate from that monitored site. For example, the "keywords" agent at the site "site" sends back to the monitoring site all the keywords and their counts from that site (i.e., that are parts of predicate KeyWords for that site).

However, certain optimization methods may minimize the amount of data sent by the agent to the monitoring site. For example, if nothing changed at a site from the previous monitoring period, there is no need to transmit any data back to the monitoring site.

Once the data arrives to the monitoring from the monitored site, it is stored in the tables allocated in step 1 using the methods known to a person with an ordinary skill in the art.

In the above-described embodiment of the present invention, once created/modified, the "agent" program periodically executes retrieval and monitoring operations (FIG. 2, step 150) as follows.

Turning now to FIG. 7, it depicts a flowchart showing steps which may be performed by an agent program and by database search and allocation element 8 at monitoring site 2 in accordance with instructions specified in the probing part of the monitoring/probing rule depicted in FIG. 3.

In step 300, at the first monitoring period, the agent program is communicated from the monitoring site 2 to monitored site(s) via the network 11 (e.g., the Internet). Once at the monitored site(s), the agent program evaluates data, sends information back to monitoring site 2 based on user-defined criteria specified in the IF portion of the monitoring/probing rule and may remain at monitored sites until completion of its tasks (if the agent is terminated by the monitored site, another copy of the agent attempts to get back to the site. That copy may come from either the monitoring site or elsewhere in the pipeline between the monitoring site and the monitored site).

For example, assuming that the IF portion of a monitor/probing clause consists entirely of an atomic condition in the form Links (site1, site2), the agent program retrieves the URLs corresponding to relevant first sites and second sites back to monitoring site 2. More specifically, an agent program may be sent to each of the relevant sites corresponding to the first argument of Links (i.e., Links (site1)). Each of the agents (sitting at site1) then sends back URLs of all the sites linked to the site at which the agent is sitting.

The database search and allocation element 8 running off computer processing device 3 on the monitoring site 2 stores the URL data into a file on the storage device 4. This file can be conceptualized as a "Links" table. Each link can be defined by URLs of site1 and site2. Thus, the table can be conceptualized as a table of columns "site1" and "site2," with each new Link entry forming a new row. In addition to this simple case, if the IF clause contains a temporal LINKs condition, the past history of links between sites would also be stored as discussed in more detail later.

One main implementation issue relating to applications using the World Wide Web is that it is stateless in the sense that it does not "remember" its history. For example, there is no way to test whether the volume of visits at the site has been monotonically increasing within the past 3 months unless the client station 1 or monitoring site 2 maintains the information about the volume of visits over time (i.e., the Web site does not maintain this information itself). Therefore, it is the responsibility of the client station 1 or the monitoring site 2 to maintain the necessary information. Thus, two related implementation issues arise as a result of the agent's data retrieval from the Internet 11.

The first issue involves what historical information needs to be maintained and where for monitoring purposes.

Given a set of triggers, monitoring site 2 or client station 1 needs to maintain the (temporal) predicates that would allow processing device 3 to evaluate temporal expressions contained in these triggers. This means that monitoring site 2 or client station 1 (hereinafter monitoring site 2 alone will be referred to) must store the current values of these predicates and, in certain cases, their past histories. For example, assume that in the IF clause user-specified predicate "LINKS (site1, site2) within past (2 months)" specifying that a link existed between site1 and site2 at some time within the past 2 months. To be able to monitor and evaluate such a predicate, monitoring site 2 needs to maintain the current state of predicate LINKS (at the present time) as well as its past history within the last two months. Since time is continuous, and processing device 3 can evaluate the presence of links between site1 and site2 only at some finite set of times, this means the user needs to specify the sampling (monitoring) rate for the evaluation of predicate LINKS. For example, the user may specify to check the status of predicate LINKS every day, or every 8 hours, or every hour. The agent will then retrieve information, and the information will be checked at the time points corresponding to the user-specified sampling rate.

Notice that it can be assumed that no abnormal changes happen to predicate LINKS between the sampling points. For example, assume that the agent samples predicate LINKS every day. Then, if the link between site1 and site2 existed yesterday and still exists today, this means that nobody deleted and inserted the same link within the last day (but it is of course possible to delete the link during that day; in this case, the system detects the change at the next sampling point).

Rather than storing the whole past history of temporal predicates, it is more efficient to store the temporal information in compressed format using the methods described below. To illustrate how this can be done, consider the example of the temporal predicate "always_past LINKS (site1, site2)," stating that there was always a link between site1 and site2 in the past. In that case, the monitoring site 2 may maintain two predicates LINKS (site1, site2) and Always_Past_Links (site1, site2) in order to monitor condition "Always_Past Links (site1, site2)", where Always_Past_Links is updated each monitoring period by removing from it the records that do not appear in predicate LINKS.

In general, information to be maintained at the monitoring site 2 can be determined as follows. Take the set of all the temporal predicates appearing in the monitoring parts of all the triggers. If the predicate is non-temporal (no trigger refers to its past history), database search and allocation element 8 will store the current copy of that predicate on the storage device 4 of the monitoring site 2 (the copy at the latest sampling period). If the predicate is temporal (some triggers refer to its past history), database search and allocation element 8 stores the current copy of that predicate and the following additional information. For each temporal operator (e.g., Always_past, Sometimes_past, etc.), database search and allocation element 8 stores an auxiliary copy of the predicate pertaining to this operator. For example, for the temporal expression Always_past LINKS (site1, site2) appearing in one of the triggers, database search and allocation element 8 store the current copy of LINKS (site1, site2) and an auxiliary predicate Always_Past_Links (site1, site2). Always_Past_Links (site1, site2) is true if and only if there was always a link from site1 to site2 in the past. Similarly, we store an auxiliary predicate Sometimes_Past_Links for the temporal expression "Sometimes_Past Links." In general, storage device 4 at monitoring site 2 maintains one auxiliary operator for every (predicate, temporal operator) pair appearing in one of the monitoring triggers (e.g., IF clause) created by the user. These auxiliary predicates can be maintained using the methods known to the person having an ordinary skill in the art (e.g., as described in Chomicki, J., "History-Less Checking of Dynamic Integrity Constraints," 8th IEEE Conference on Data Engineering, Phoenix, Ariz., 1992, pp. 25-26).

For example, predicate (table) Always_Past_Links is updated by database search and allocation element 8 every monitoring period by removing records (site1, site2) from it that do not appear in the current copy of Links (site1, site2). Note that these auxiliary predicates are non-temporal (they only simulate temporal predicates but do not have any temporal component as part of their structure) and can be stored using the conventional methods known to someone with an ordinary skill in the art.

The retrieval of information from the Internet also raises a second, related issue. One of the steps in predicate maintenance noted above is the step of the agent obtaining the current copy of the predicate. This means the agent must visit the monitored site(s) (e.g., on the Internet 11) and evaluate the present conditions of the predicate(s) at that site. One of the central issues in this process is what information should the agent check and, even more importantly, what information it should bring back from the monitored site(s) 11 to the monitoring site 2. This is a critical issue because we want to monitor many sites and need to minimize the data to be transferred back to the monitoring site in order not to clog the communication lines.

As was demonstrated above, for the monitoring purposes, it is necessary for the agent program to bring back at each monitoring period only the current states of the predicates that are maintained on the storage means 4 of the monitoring site 2, such as Links, Web_Sites, Key-Words, etc.

An optimization issue arises when less data than is in the current copy of the predicate being monitored can possibly be brought back to the monitoring site 2. For example, assume that the temporal predicate being monitored in the IF-clause of a trigger is "Always_Past LINKS (site1, site2)". As was explained above, this predicate can be monitored through the database search and allocation means 8 creating and storing an auxiliary predicate Always_Past_Links (site1, site2). Note that this predicate is monotonically decreasing over time. Also note that rather than retrieving the relation LINKS in its entirety at each monitoring period, the agent program may retrieve only the records from the intersection of Always_Past_Links and Links.

In general, if auxiliary predicates are monotonically decreasing (such as Always_past_Links), then the agent retrieves auxiliary predicates rather than the current predicates (e.g., LINKS). To the contrary, if auxiliary predicates do not decrease over time (such as Sometimes_Past_Links), the current predicates are retrieved by the agent from the Web sites on the network 11 being monitored.

Data transmission can be further optimized when no significant changes occur at the monitored sites. In that case, data need not be transmitted to the monitoring site 2. For example, the agent may have stored a previous copy of the predicate either at monitored or, in the event this is impossible, at other intermediate sites in the network 11. To determine whether a predicate has changed since the last monitoring period, the agent may then compare the previous copy with a current copy of the predicate using techniques known in the art. If the copies differ, then, and only then, is the predicate transmitted to the monitoring site 2. Alternatively, the agent may determine the differences between current and previous copies and transmit only those differences.

The optimization and implementation issues noted above are effected by agent creation/modification element 9 at monitoring site 2.

Turning now to FIG. 7, step 302, in one embodiment of the present disclosure, once the agent program retrieves user-specified data to the monitoring site 2 and database search and allocation element 8 stores the information, processing device 3 checks the stored information to determine if it satisfies the userspecified condition (e.g., in IF clause) (using methods well known in the art).

In one embodiment of the present disclosure, when the user-specified condition is satisfied, then in step 303 (FIG. 7), database search and allocation element 8 running off processing element at 3 monitoring site performs an SQL search on files (tables) of data on storage device 4 already retrieved from Internet 11, as described above, or performs other probing actions described later.

In step 304, the results of the SQL search or other probing actions are sent from monitoring site 2 to client station(s) 1 via e-mail (or other notification means) where they may be displayed on display means 7 for the user's benefit. E-mail is commonly used and its implementation is well-known in the art. Of course, such notification becomes even simpler when the system does not include monitoring site 2, as noted above.

Notice that in an alternative embodiment, the probing operation may search and return information from the Internet 11 instead of monitoring site 2 as just mentioned. Where information is returned from the Internet 11, one of ordinary skill may use any of the existing known Web-related information retrieving methods.

In addition, in other alternative embodiments, other types of probing or other operations may also be performed as a part of the THEN clause upon satisfaction of user-defined conditions of the IF clause.

As a first example, monitoring site 2 may send back to client station 1 information corresponding to user-defined condition detected by processing means 3 at monitoring site 2, and client station 1 simultaneously issues an alarm. For example, the IF-THEN clause (in English):

IF the keyword "Cable Modem" appears at a site but the keyword "Push Technology" does not appear at that site THEN issue an alarm and return that information to the user, returns the names of all the sites where the keyword "Cable Modem" appears but not the keyword "Push Technology."

As a second example, at least one embodiment of the present disclosure may execute a program written in a general-purpose programming language (e.g., C) that examines certain conditions. For example, such program may visit different Web sites in some sequence and return the URLs of those sites that satisfy certain properties (e.g., have increasingly higher visitation traffic).

As a third example, a data mining query may be executed. Data mining queries, also known as pattern templates, are constructs for the specification of types of patterns to be discovered. Therefore, probing actions can further explore what is "going on" on one or several network sites when the IF condition(s) of a rule are satisfied by letting the data mining query discover network-related patterns. Several researchers considered data mining queries (pattern templates) in the context of knowledge discovery. Imielsinki, T., Virmani, A., and Abdulghani, A., "DataMine: Application Programming Interface and Query Language for Database Mining," Proceedings of the Second International Conference on Knowledge Discovery and Data Mining, August, 1996; Klemettinen, M., Mannila, H., Ronkainen, P., Toivonen, H., and Verkamo, A. I., "Finding Interesting Results from Large Sets of Discovered Association Rules," Proceedings of the Third International Conference on Information and v'Knowledge Management," December, 1994; Han, J., Fu, Y., Wang, W., Koperski, K., and Zaiane, O., "DMQL—A Data Mining Query Language for Relational Databases," Proceedings of the (SIGMOD) Workshop on Research Issues on Data Mining and Knowledge Discovery, June, 1996; Shen, W., Ong, K., Mitbander, B., and Zaniolo, C., "Metaqueries for Data Mining," Advances In Knowledge Discovery and Data Mining, chap. 15, AAAI Press, 1996.

Imielsinki, et al. introduce the M-SQL query language as an extension of SQL by including a small set of primitive data mining operations. M-SQL queries operate on the underlying database and on a set of previously discovered rules and return a set of rules discovered in the data that satisfy the conditions of the query.

For example, the query "Find all rules in Table T involving attributes Disease, Age, and ClaimAmt, which have a confidence of at least 50%" can be expressed in M-SQL (Imielsinki et al.) as:

```
SELECT   *
FROM     Mine(T) R
WHERE    R.Body < {(Disease=*), (Age=*),
         (ClaimAmt=*)}
         and { } < R.Body and R.Consequent IN
         {(Disease=*), (Age=*), (ClaimAmt=*)} and
         R.Confidence > 0.5
```

The Mine operator returns all the association rules (Agrawal, R., Mannila, H., Srikant, R., Toivonen, H., and Verkamo, A. I., "Fast Discovery of Association Rules," *Advances in Knowledge Discovery and Data Mining, Chap. 12*, AAAI Press, 1996; Imielsinki, et al., 1996) that are true in T, and the WHERE-clause imposes conditions on them, such as that the body of a rule should not be empty and should contain attributes Disease, Age, and ClaimAmt. Also, the consequent of the rule must contain one of these attributes and the confidence should be at least 50%.

M-SQL queries are evaluated by launching discovery methods, as described in "DataMine: Application Programming Interface and Query Language for Database Mining," Proceedings of the Second International Conference on Knowledge Discovery and Data Mining, August, 1996.

Han et al. designed the data mining language DMQL. A query in DMQL consists of the specification of four data mining primitives:

(1) the set of data relevant to the data mining process;
(2) the kind of knowledge to be discovered, i.e., a characteristic, discriminant, classification, or an association rule;
(3) the background knowledge consisting of a set of concept hierarchies or generalization operators which provide corresponding higher level concepts; and
(4) the interestingness of the knowledge to be discovered, which is specified with a set of different mining thresholds.

For example, the query "Classify students according to their GPAs and find their classification rules for those majoring in computer science and born in Canada, with the attributes birth place and address in consideration" can be expressed (Han, et al., 1996) as:

Find classification rules for CS_Students According to GPA
Related to birth_place, address From Student
Where major='CS' AND birth place='Canada'

It was Shen et al. that defined metaqueries, which can be viewed as a two-part specification. The left-hand side (LHS) of a metaquery specifies a constraint on how data should be prepared, and the right-hand side (RHS) specifies an action to be applied on the prepared data. For example, consider metaquery:

$P(X,Y)$ AND $Q(Y,Z) \rightarrow R(X,Z)$

This metaquery is a template that instantiates various transitivity patterns depending on the predicates to be substituted for templates P, Q, and R and the attributes and values substituted for variables X, Y, and Z.

For instance, consider the transitivity pattern: $p(X,Y)$ AND $q(Y,Z) \rightarrow r(X,Z)$ [with probability Pr]. This pattern satisfies the earlier specified metaquery, where predicates p, q, and r are specific database relations, and Pr is the ratio of the (X,Z) pairs satisfying the LHS and the RHS of the rule and those satisfying only the LHS. Then, the action in the RHS of the metaquery lies in computing the value of Pr.

The notion of a pattern template was also introduced in Klemettinen, et al., for the purpose of identifying interesting patterns. A pattern template in Klemettinen, et al. is a rule $A\_1$ AND ... AND $A\_k \rightarrow A\_\{k+1\}$ where each $A\_i$ is either an attribute name, a class name or an expression C+ or C* corresponding, respectively, to one or more and zero or more instances of the class C. Such a template defines a class of rules that are instances of the template pattern.

For example, consider a pattern template that says that students can take an advanced elective in some department if they have taken a core course offered by that department and one or several electives:

CORE (Dept, Student) AND ELECTIVE (Dept, Student)+→ADV_ELECTIVE (Dept, Student)

where CORE, ELECTIVE, and ADV_ELECTIVE are classes of certain courses offered at that university. Given this template and assuming that a and b are confidence and support thresholds (Klemettinen, et al.), the rule

```
Intro_CS(CS,Student) AND Programming_Lang(CS,Student) AND
S
Operating_Systems(CS,Student-->
Special_Topics_in_OSes(CS,Student) [a, b]
``` matches this template.

The above references to user notification and program execution operations upon satisfaction of a condition can be implemented by a person having ordinary skills in the art. In addition, whenever information is to be returned from the monitoring site 2 to the user, one of ordinary skill in the art can use any of the known database information retrieval methods, such as the utilization of any of the existing database query languages.

It is readily apparent that numerous other modification, combinations of, and minor additions to the above disclosure may be made for the benefit of network users while remaining within the scope of the present disclosure. For example, a useful way of implementing at least one embodiment of the present disclosure is for the monitoring site 2 to act as server to more than one client station 1, and to maintain a separate account file for each such client station 1.

The account files could include the monitoring conditions and probing instructions associated with their respective client station. Accordingly, more than one client at more than one location could simultaneously benefit from the present disclosure, each according to their own needs, in the manner described above.

What is claimed is:

1. A system for performing at least one notification on a network, comprising:
   a computing device which is configured to:
      receive first information from at least one stateless node on the network at one or more times, wherein the first information relates to a visit rate for the at least one stateless node;

record at least one portion of the received information as at least part of or to be included in second information, wherein the second information includes a set of one or more keywords associated with the at least one stateless node;

analyze the first information and the second information; and generate the at least one notification based on the analysis of the first information and the second information.

2. The system according to claim 1, wherein the computing device is configured to analyze the first information and the second information by determining whether the first information or the second information meets at least one predetermined criteria.

3. The system according to claim 2, wherein the at least one stateless node includes a plurality of stateless nodes, wherein the analysis of the first information and the second information is performed by determining whether the first information or the second information meets at least one predetermined criteria from each of the plurality of nodes, and wherein the at least one criteria involves each of the nodes.

4. The system according to claim 1, wherein the computing device is configured to receive first information by collecting the first information at a plurality of times from at least one node.

5. The system according to claim 1, wherein the computing device is configured to receive first information by collecting the first information at a plurality of times from a plurality of nodes.

6. The system according to claim 1, wherein the at least one stateless node includes a plurality of stateless nodes.

7. The system according to claim 1, wherein the at least one stateless node includes a plurality of stateless nodes, and wherein the second information further includes data associated with a relationship between the plurality of stateless nodes.

8. The system according to claim 1, wherein the computing device is configured to analyze the first information and the second information by determining whether the visit rate is greater than or equal to a threshold visit rate.

9. A computer system configured to perform at least one notification on a network, comprising:

at least one computer accessible medium including thereon at least one module, wherein, in response to execution of the at least one module by a computing device, the computing device is configured to:

receive first information from at least one stateless node on the network at one or more times, wherein the first information relates to a visit rate for the at least one stateless node;

record at least one portion of the received information as at least part of or to be included in second information, wherein the second information includes a set of one or more keywords associated with the at least one stateless node;

analyze the first information and the second information; and generate the at least one notification based on the analysis of the first information and the second information.

10. The computer system according to claim 9, wherein the computing device is configured to analyze the first information and the second information by determining whether the first information or the second information meets at least one predetermined criteria.

11. The computer system according to claim 10, wherein the at least one stateless node includes a plurality of stateless nodes, wherein the analysis of the first information and the second information is performed by determining whether the first information or the second information meets at least one predetermined criteria from each of the plurality of nodes, and wherein the at least one criteria involves each of the nodes.

12. The computer system according to claim 9, wherein the computing device is configured to receive first information by collecting the first information at a plurality of times from at least one node.

13. The computer system according to claim 9, wherein the computing device is configured to receive first information by collecting the first information at a plurality of times from a plurality of nodes.

14. The computer system according to claim 9, wherein the at least one stateless node includes a plurality of stateless nodes.

15. The computer system according to claim 9, wherein the at least one stateless node includes a plurality of stateless nodes, and wherein the second information further includes data associated with a relationship between the plurality of stateless nodes.

16. The computer system according to claim 9, wherein the computing device is configured to analyze the first information and the second information by determining whether the visit rate is greater than or equal to a threshold visit rate.

17. A non-transitory computer-accessible medium including a plurality of executable instructions that, in response to execution by a first hardware processing arrangement, configure the first hardware processing arrangement to perform procedures, comprising:

receiving first information from at least one stateless node on the network at one or more times, wherein the first information relates to a visit rate for the at least one stateless node;

recording at least one portion of the received information as at least part of or to be included in second information, wherein the second information includes a set of one or more keywords associated with the at least one stateless node;

analyzing the first information and the second information; and generating the at least one notification based on the analysis of the first information and the second information.

18. The non-transitory computer-accessible medium according to claim 17, wherein the hardware processing arrangement is configured to perform the analyzing procedure by determining whether the first information or the second information meets at least one predetermined criteria.

19. The non-transitory computer-accessible medium according to claim 18, wherein the at least one stateless node includes a plurality of stateless nodes, wherein the analysis of the first information and the second information is performed by determining whether the first information or the second information meets at least one predetermined criteria from each of the plurality of nodes, and wherein the at least one criteria involves each of the nodes.

20. The non-transitory computer-accessible medium according to claim 17, wherein the hardware processing arrangement is configured to perform the receiving procedure by collecting the first information at a plurality of times from at least one node.

21. The non-transitory computer-accessible medium according to claim 17, wherein the hardware processing arrangement is configured to perform the receiving procedure by collecting the first information at a plurality of times from a plurality of nodes.

22. The non-transitory computer-accessible medium according to claim 17, wherein the at least one stateless node includes a plurality of stateless nodes.

23. The non-transitory computer-accessible medium according to claim 17, wherein the at least one stateless node includes a plurality of stateless nodes, and wherein the second information further includes data associated with a relationship between the plurality of stateless nodes.

24. The non-transitory computer-accessible medium according to claim 17, wherein the hardware processing arrangement is configured to perform the analyzing procedure by determining whether the visit rate is greater than or equal to a threshold visit rate.

* * * * *